(No Model.)
F. M. HUNT.
SINGLETREE HOOK.
No. 571,370. Patented Nov. 17, 1896.
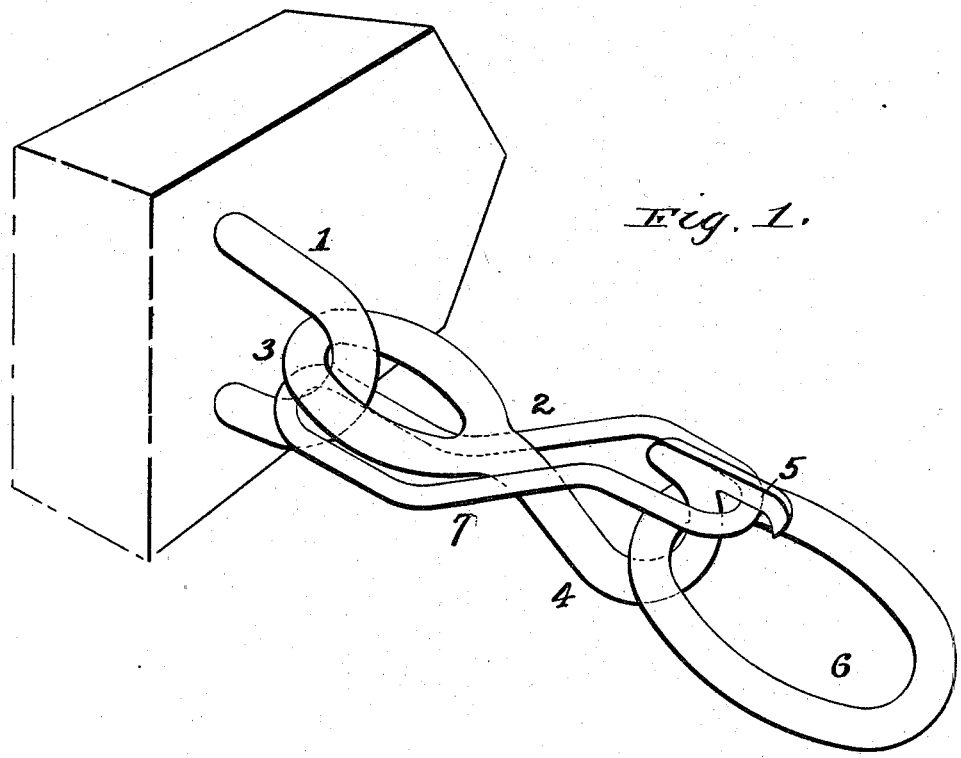
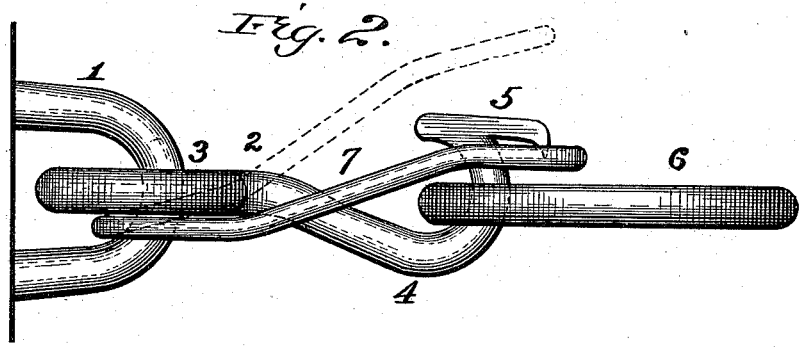
Witnesses
G. M. Lamasure
G. H. Walmsley
Inventor,
Frank M. Hunt,
By Alexander Davis,
Attorneys

UNITED STATES PATENT OFFICE.

FRANK M. HUNT, OF ROUND OAK, GEORGIA.

SINGLETREE-HOOK.

SPECIFICATION forming part of Letters Patent No. 571,370, dated November 17, 1896.

Application filed March 18, 1896. Serial No. 583,721. (No model.)

*To all whom it may concern:*

Be it known that I, FRANK M. HUNT, a citizen of the United States, residing at Round Oak, in the county of Jones and State of Georgia, have invented certain new and useful Improvements in Singletree-Hooks, of which the following is a specification, reference being had therein to the accompanying drawings.

This invention has for its object to provide an improved device for locking trace-chains to singletree-hooks, thereby preventing accidental detachment of the chains while in use, as more fully hereinafter set forth.

In the drawings, Figure 1 is a perspective view of my improved device, and Fig. 2 a side elevation thereof.

Referring to the drawings by numerals, 1 is a closed staple fixed rigidly to the singletree or other part, and 2 the singletree-hook connected to the staple by means of a closed horizontal eye 3, this eye being sufficiently large to permit the hook to have a free swinging and longitudinal movement on the staple. Projecting from the front end of the eye is a hook 4, which lies in a plane at right angles to the eye and is curved upward and rearward. Formed integral with the upper end of the hook 4 is a short horizontal extension 5, which projects rearwardly from the hook and is turned abruptly downward at its free end. The ring 6 of the trace or trace-chain engages in the open hook 4 in the usual manner. The ring is locked in the hook by means of a closed link 7, whose side bars are approximately parallel and whose rear end is permanently engaged in the staple under the eye 3 and whose forward end is bent upward and engages under the hooked portion 5, the forward portion of its link lying above the trace-ring and thereby confining it within the hook. It will be observed that this link is loosely connected to the staple, but is confined below the eye of the hook by reason of the eye being wider than the link. It will also be seen that where the link bends upward in front of the eye it embraces the hook 4.

It will be observed that whether the hook be swinging free or under draft tension the link will normally rest or remain in the position shown, but when it is desired to disconnect the trace-chain it is simply necessary to move the hook backward toward the singletree far enough to let the link swing upward off the hooked extension 5, as shown in Fig. 2.

This device is particularly advantageous in plowing, as with the common form of trace-hooks the traces are continually becoming disengaged from the hooks, and this is especially so in turning at the ends of the furrows. The device is also advantageous in that it will prevent the driving-lines from becoming engaged in the trace-hooks.

Since this device may be used with equal advantage on hooks other than trace-hooks, I desire it understood that I do not confine my claim to the use of trace-hooks.

An essential feature lies in the peculiar construction of the forward end of the singletree-hook, whereby the trace-ring will at all times exert a pressure against the under side of the link and keep it pressed up against the projection 5. It will be observed that the projection extends beyond the forward end of the hook and that the end portion of the hook curves downward and backward toward the eye, the curvature being just sufficient to throw the trace-ring against the link, and this pressure against the link will be exerted whether the trace be drawn taut or be swinging loosely. This means for insuring pressure against the link when the trace be dangling loose is especially advantageous in plowing, as at the end of each furrow the traces are allowed to dangle loose while turning the plow.

Having thus fully described my invention, what I claim is—

In a locking device for trace and other hooks, the combination of a hook 2 having an eye 3 and a forwardly-projecting hook 4 lying in a plane different from the eye 3, said hook 4 being provided with a forward extension at its free end, this extension projecting beyond the forward end of the hook portion 4 and this hook portion curving backward toward the eye, a staple or eye engaging said eye 3, whereby said hook shall be capable of a longitudinal movement, and a locking-link engaging the staple under the eye 3 and bent upward to embrace the hook and lie normally under the extension thereon, this link serving to close the hook 4, substantially as described.

In testimony whereof I affix my signature in presence of two witnesses.

FRANK M. HUNT.

Witnesses:
J. W. TURK,
L. W. GRAY.